(12) United States Patent
Roithinger

(10) Patent No.: US 7,314,037 B2
(45) Date of Patent: Jan. 1, 2008

(54) ENGINE BRAKE SYSTEM OF A MULTICYLINDER INTERNAL COMBUSTION ENGINE COMPRISING A COOLED INTERMEDIATE PIPE FOR EXCHANGING GAS BETWEEN CYLINDERS DURING ENGINE BRAKING

(75) Inventor: Robert Roithinger, St. Valentin (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 10/546,244

(22) PCT Filed: Feb. 19, 2004

(86) PCT No.: PCT/AT2004/000053

§ 371 (c)(1),
(2), (4) Date: May 16, 2006

(87) PCT Pub. No.: WO2004/074648

PCT Pub. Date: Sep. 2, 2004

(65) Prior Publication Data

US 2006/0260567 A1 Nov. 23, 2006

(30) Foreign Application Priority Data

Feb. 20, 2003 (AT) .............................. GM106/2003

(51) Int. Cl.
*F02D 13/04* (2006.01)
*F02M 31/00* (2006.01)

(52) U.S. Cl. ................... 123/316; 123/321; 123/41.31; 123/540

(58) Field of Classification Search ............. 123/41.31, 123/316, 320, 321, 540–542
See application file for complete search history.

(56) References Cited

U.S. PATENT DOCUMENTS

| 4,426,844 | A | | 1/1984 | Nakano |
| 4,759,180 | A | | 7/1988 | Rognon |
| 6,006,730 | A | * | 12/1999 | Rutke et al. ................. 123/542 |
| 6,216,667 | B1 | | 4/2001 | Pekar |
| 6,478,009 | B1 | * | 11/2002 | Seitz et al. .................. 123/321 |
| 6,776,144 | B1 | * | 8/2004 | Newman ..................... 123/540 |

FOREIGN PATENT DOCUMENTS

AT 4963 1/2002

(Continued)

*Primary Examiner*—Hai Huynh
(74) *Attorney, Agent, or Firm*—Dykema Gossett PLLC

(57) ABSTRACT

The invention relates to a multicylinder internal combustion engine (1) comprising intake valves and exhaust valves that are provided with at least one additional valve (10) for each cylinder (C1, C2, C3, C4, C5, C6), a preferably tubular pressure container (9) with a gas chamber (90) into which extend ducts (11) originating from the valves (10) such that gas can be exchanged between individual cylinders (C1, C2, C3, C4, C5, C6) when the valves (10) are actuated. The pressure container (9) is provided with a device (17) for cooling the quantities of gas exchanged between individual cylinders (C1, C2, C3, C4, C5, C6). In order to increase the cooling capacity, the cooling device (17) encompasses at least one cooling pipe (17) which is axially inserted into the pressure container (9) and is penetrated by coolant. The outer jacket (171) of the cooling pipe (170) borders the gas chamber (90), the gas that is exchanged between individual cylinders (C1, C2, C3, C4, C5, C6) flowing around said outer jacket (171).

14 Claims, 4 Drawing Sheets

FOREIGN PATENT DOCUMENTS

| | | |
|---|---|---|
| DE | 2502650 | 7/1976 |
| DE | 3428626 | 2/1986 |
| DE | 3935367 | 4/1991 |
| EP | 0828061 | 3/1998 |
| EP | 0898059 | 2/1999 |
| GB | 603499 | 6/1948 |

* cited by examiner

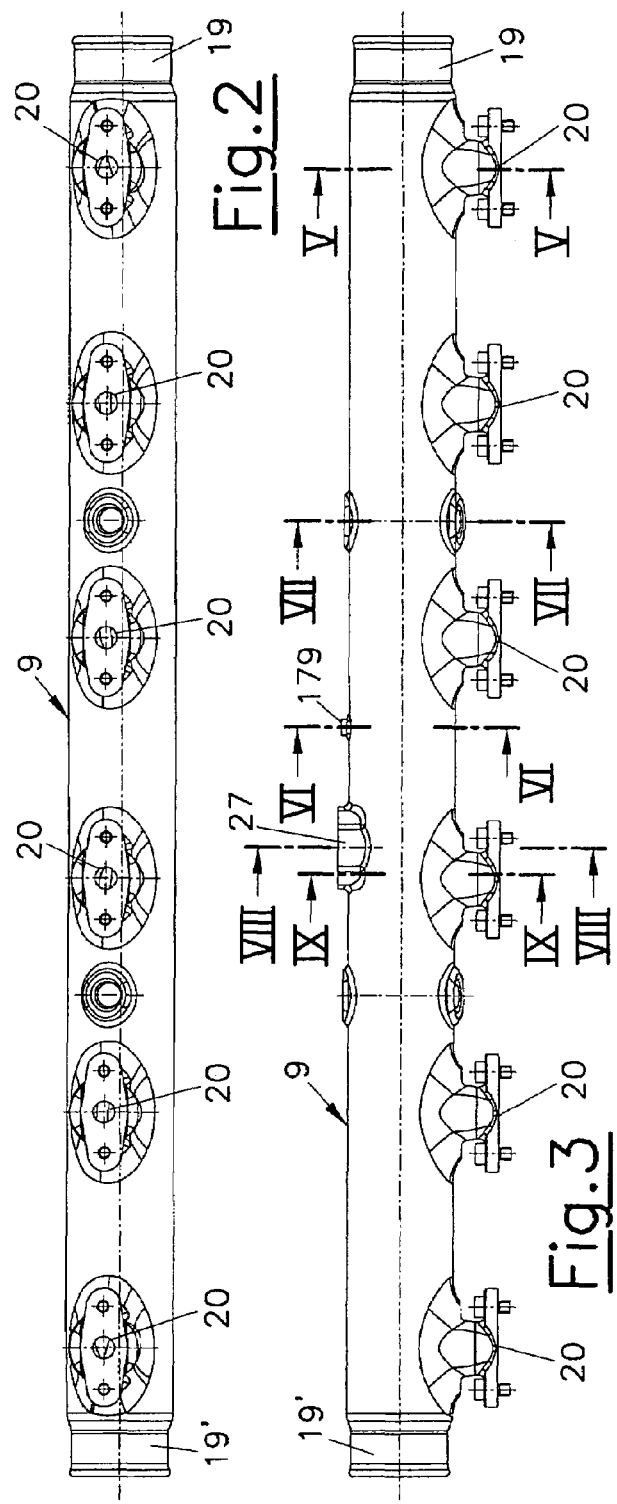

ENGINE BRAKE SYSTEM OF A MULTICYLINDER INTERNAL COMBUSTION ENGINE COMPRISING A COOLED INTERMEDIATE PIPE FOR EXCHANGING GAS BETWEEN CYLINDERS DURING ENGINE BRAKING

BACKGROUND OF THE INVENTION

1. Field of the Invention

The invention relates to a multicylinder internal combustion engine comprising intake valves and exhaust valves which are provided with at least one additional valve for each cylinder, a preferably tubular pressure container with a gas chamber into which extend ducts originating from the valves, so that gas can be exchanged between individual cylinders when the valves are actuated. The pressure container comprises a device for cooling the quantities of gas exchanged between individual cylinders.

2. The Prior Art

Brake systems integrated in vehicle engines, especially in utility vehicles, are gaining increasingly in importance because these systems concern additional brake systems that are cost-effective and compact. The increase in the specific output of modern utility vehicles, however, also requires an increase in the braking power to be achieved.

A four-stroke internal combustion engine with two groups of cylinders with four cylinders each is known from DE 34 28 626 A. Each cylinder comprises gas exchange valves and an additional exhaust valve. The additional exhaust valves are opened during the entire braking process in braking operations. Moreover, a throttle valve which is torsionally rigidly held on a shaft is arranged in the common exhaust port of the two cylinder groups. Its position can be influenced by a control rod by an actuating device. The disadvantageous aspect in this known system is the dependence on the speed, especially a relatively low braking output in the lower speed range.

DE 25 02 650 A further shows a valve-controlled reciprocating internal combustion engine in which compressed air is conveyed into a feed boiler via a compressed-air valve and is guided back during the starting via the same compressed-air valve for work output.

A decompression valve motor brake system is known in this connection from EP 0 898 059 A with which a compressed-air generator can be realized for all operating states of the internal combustion engine. A compressed-air tank of a compressed-air system is filled with compressed gas from the combustion chamber of the cylinders via a bypass line. One or more cylinders can be used for supplying the compressed-air system.

A motor brake system is known from EP 0 828 061 A in which a gas exchange is enabled between the individual cylinders via the common exhaust manifold. The gas exchange occurs via the exhaust valves of the six-cylinder internal combustion engine. The disadvantageous aspect in this motor brake system is, among other things, the relatively low achievable brake pressure.

GB 603 499 A describes a device for heat recovery from exhaust gas for internal combustion engines. A heat exchanger which is flowed through by a fluid is arranged in an exhaust manifold.

A multicylinder internal combustion engine of the kind mentioned above is known from AT 4.963 U1. It comprises a tubular pressure container with a pressure-control valve into which brake ports open which originate from brake valves, so that a gas exchange is enabled between the individual cylinders when the brake valves are actuated. In order to increase the braking power, the pressure container comprises a device for cooling the gas quantities exchanged between the individual cylinders, which device is integrated in the coolant circulation of the internal combustion engine. The cooling device comprises a cooling jacket which is flowed through by the coolant, which cooing jacket encloses the tubular pressure container. Although the braking power can be increased considerably by the cooling device, a further increase in the braking power would be desirable.

It is the object of the present invention to avoid such disadvantages and to further improve the cooling of the gas in the pressure container in an internal combustion engine.

SUMMARY OF THE INVENTION

This is achieved in accordance with the invention in such a way that the cooling device comprises at least one cooling pipe which is axially inserted into the pressure container and is penetrated by coolant, with the outside jacket of the cooling pipe being adjacent to the gas chamber and being circulated by gas exchanged between the individual cylinders. The cooling capacity and thus the braking power of the motor brake device can be increased by the cooling pipe penetrated by the coolant. A further increase of the cooling capacity is enabled in such a way that the cooling device comprises a bundle of coolant-penetrated cooling pipes which is inserted axially into the pressure container. The outsides of the cooling pipes border the gas chamber of the pressure container and are circulated by gas exchanged between the individual cylinders.

For the purpose of increasing the heat-dissipating surfaces it is especially advantageous when in the gas chamber of the pressure container there is arranged at least one cooling fin which is connected with a cooling pipe in a thermally conductive way. As an alternative or in addition it may be provided that at least one cooling fin which is connected in a thermally conductive manner with the cooling pipe is arranged within at least one cooling pipe.

It is provided for in a further embodiment of the invention that the at least one cooling fin is twisted in a screw-like manner in the direction of the longitudinal axis of the pressure container. The screw-like twisting of the cooling fin further increases the thermally conductive surface and improves the heat transmission to the coolant. The twisting further increases the swirling in the gas chamber or the coolant chamber. In comparison with a cooling jacket which encloses the tubular pressure container, a considerable increase of the cooling capacity can be effected.

It can further be provided for within the scope of the invention that the cooling device additionally comprises a cooling jacket penetrated by the coolant, which jacket encloses the tubular pressure container. The cooling capacity and thus the braking power can be increased in an especially high way.

The cooling pipe or the bundle of cooling pipes is preferably sealed on the coolant side with O-rings. On the gas side, the piston rings protect the O-rings from being directly subjected to the hot braking or exhaust gas.

In order to secure the cooling pipes against oscillations it is provided that the cooling pipe is connected with at least one fixing device (preferably formed by a screw) with the pressure container. The fixing device is preferably arranged in the region of half the length of the cooling pipe. As a result of the central arrangement of the fixing device, thermal expansions of the cooling pipe are divided to both sides of the fixing device.

In the case of a bundle of cooling pipes it is advantageous when several cooling pipes are joined with a flange and this entire pipe package is axially inserted into the pressure container. The inserted cooling pipe or the inserted bundle of cooling pipes is only included in the cooling circulation at the ends.

In order to keep production costs as low as possible it is advantageous when the cooling pipe is an extruded profile. It can be provided for alternatively that the cooling pipe is a hydroformed thin-walled sheet metal pipe. It is further possible that the cooling fins are soldered onto the cooling pipes.

The cooling fins can be provided integrally with the heat pipe or in several parts.

The invention is explained below in closer detail by reference to the enclosed drawings.

BRIEF DESCRIPTION OF THE DRAWINGS

FIG. 2 shows a pressure container of the internal combustion engine in a first embodiment in a side view;

FIG. 3 shows the pressure container in a top view;

FIG. 4 shows the pressure container in a front view;

FIG. 5 shows the pressure container in a sectional view according to line V-V in FIG. 3;

FIG. 6 shows the pressure container in a sectional view according to line VI-VI in FIG. 3;

FIG. 7 shows the pressure container in a sectional view according to line VII-VII in FIG. 3;

FIG. 8 shows the pressure container in a sectional view according to line VIII-VIII in FIG. 3;

FIG. 9 shows the pressure container in a sectional view according to line IX-IX in FIG. 3;

DETAILED DESCRIPTION OF THE PREFERRED EMBODIMENTS

Figure 1:
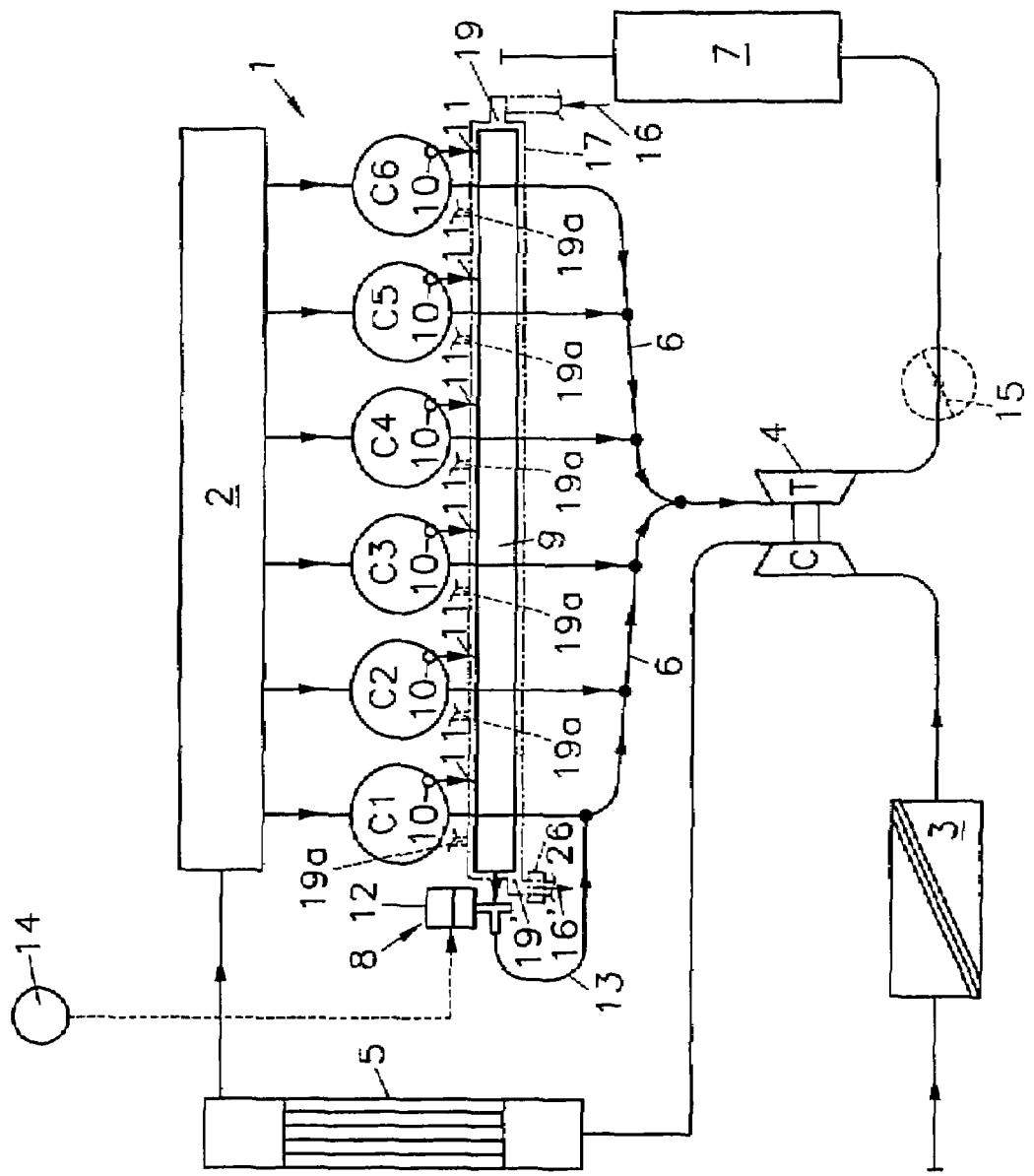
FIG. 1 shows a schematic illustration of an internal combustion engine in accordance with the invention.
Figure 10:
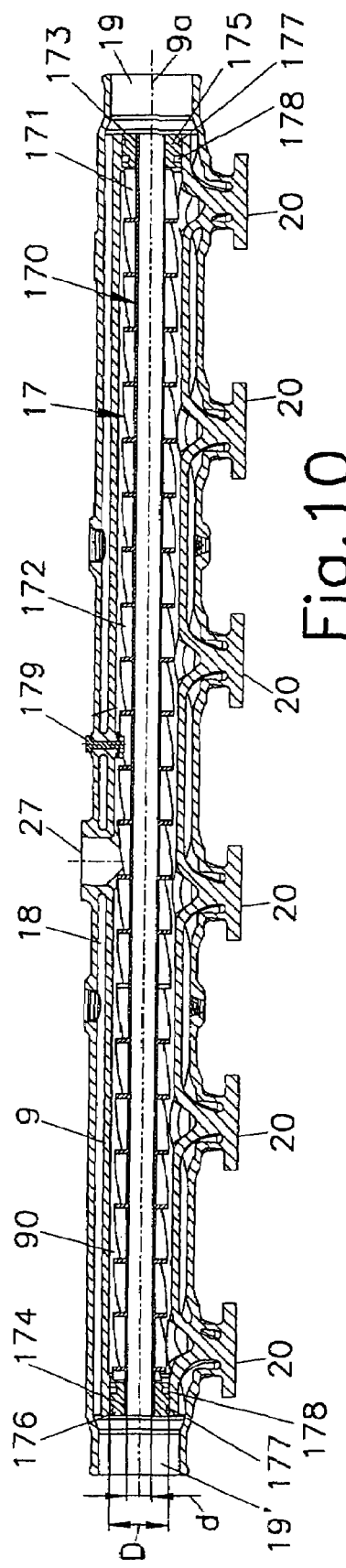
FIG. 10 shows the pressure container in a sectional view according to line X-X in FIG. 4.
Figure 11:
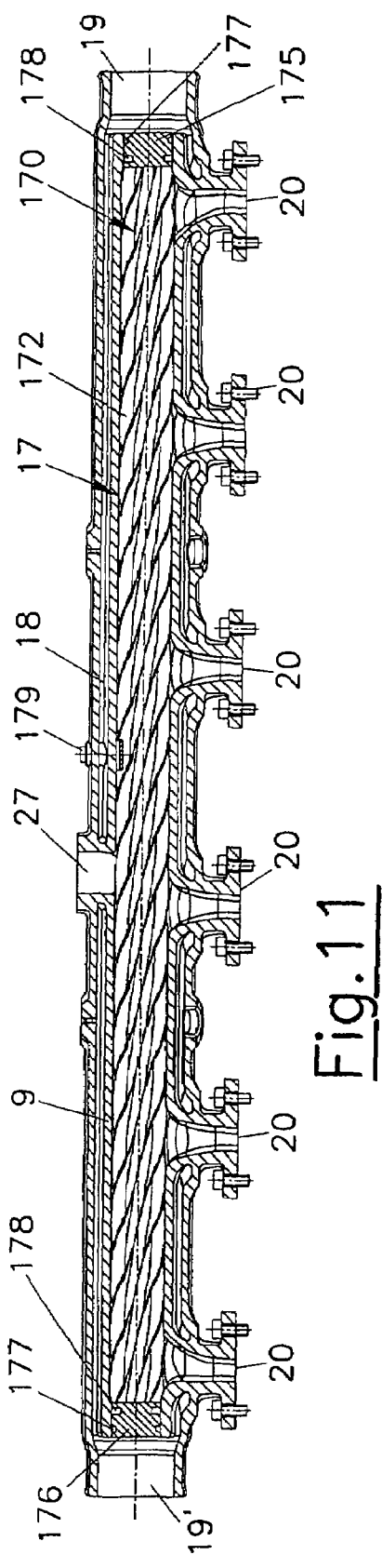
FIG. 11 shows the pressure container in a sectional view according to line XI-XI of FIG. 4.

The invention is explained in detail by reference to FIG. 1 based on the example of a six-cylinder turbocharger engine. Notice must be taken that the function of the engine brake device in accordance with the invention is independent both of the number of cylinders as well as the charging system and can also be used in an aspirating engine.

The six cylinders C1 to C6 of internal combustion engine 1 are in connection with an intake manifold 2 via intake ports (not shown in closer detail), which intake manifold is supplied with charge air starting from the air filter 3 via the compressor part C of the turbocharger 4 and via the charge air cooler 5. The exhaust valves of the internal combustion engine 1 open into the exhaust system 6, with the exhaust gases being guided in a conventional manner via the turbine part T of the turbocharger 4 and exit via a muffler 7.

The engine brake device comprises a tubular pressure container 9 (brake rail). Ports 11 originating from the valve 10 lead to said pressure container, so that a gas exchange is enabled between the individual cylinders C1 to C6 at a relatively high pressure level. In braking operations of the internal combustion engine 1, the valves 10 are actuated several times per working cycle of the engine, e.g. two braking strokes per working cycle, with the first braking stroke occurring close to the upper dead center of the high-pressure stroke. During this braking stroke, highly compressed air exits from one of the cylinders C1, C2, C3, C4, C5 or C6 into the brake rail 6. As a result, the brake rail 6 is filled with compressed air on the one hand (up to approx. 20 bars of working pressure), and the expansion work of the cylinder is reduced on the other hand, thus leading to braking power. Shortly after the closure of the intake valve, the valve 10 opens again, as a result of which compressed air flows from the brake rail 9 into the combustion chamber. As a result of the second braking stroke, the cylinder pressure rises at the beginning of the compression phase of the high-pressure cycle to the pressure level of the brake rail 9. This increases the compression work to be applied and thus the braking power of the engine.

A pressure control valve 12 which is controlled electronically for example limits the maximum pressure in the brake rail 9 in order to prevent any damage to the engine. This control valve 12 further allows the driver to reduce the pressure in the brake rail 9 by means of a brake switch 14 in the driver's cabin for example, such that the compressed air is bled from the brake rail 9 via the connecting line 13 to the exhaust system and thus the braking power can be adjusted to the respective driving situation.

An exhaust gas vane 15 is shown as an alternative with the broken line. It can be combined with the brake device in accordance with the invention.

The pressure container 9 advantageously comprises a cooling device 17 integrated in the coolant circulation 16, 16' of the internal combustion engine for cooling the gas quantities exchanged between the individual cylinders C1 to C6. As indicated with arrow 16, the coolant reaches the cooling device 17 via a coolant connection 19 at one end of the pressure container and is recycled back to the coolant circulation again via a further connection 19' on the cooling device 17 at the other end of the pressure container 9 (see arrow 16'). As an alternative to a single coolant circulation 19, one coolant connection 19a can be provided per cylinder for supplying the coolant. The motor brake device can also be used in engine operation as an exhaust gas recirculation system. The cooling device 17 is used in this case as a cooler for the recirculated exhaust gas.

The pressure container 9 with the cooling device 17 which is shown only in a schematic way in FIG. 1 is shown in detail in FIGS. 2 to FIG. 11. The cooling device 17 comprises a cooling pipe 170 which is inserted from a face side axially into the tubular pressure container 9. The outside diameter d of the cooling pipe 170 is substantially smaller than the inside diameter D of the pressure container 9, so that an annular pressure chamber 90 is formed between the cooling pipe 170 and the pressure container 9. The cooling pipe 170 is penetrated by coolant between the coolant connections 19, 19' and is penetrated by braking or exhaust gas in the pressure chamber 90. The pressure chamber 90 is connected via port connections 20 with the ports 11 originating from the cylinders C1, C2, C3, C4, C5, C6. The connection 27 on the output side leads to the connecting line 13 with the exhaust gas system 6.

In order to increase the heat transmission between the pressure chamber 90 and the cooling pipe 170, the cooling pipe 170 comprises cooling fins 172 on its outside jacket 171, which fins are twisted in a screw-like manner, increase the surface touched by the hot gas and also increase the turbulence. Cooling fins can also be arranged on the coolant side within the cooling pipe 170 as a alternative to this or in addition to the same.

The cooling pipe 170 is held by flanges 175, 176 in the pressure container 9 in a longitudinally displaceable manner in the region of the two ends 173, 174, so that thermal expansions can be compensated. The cooling pipe 170 is sealed on the coolant side by O-ring seals 177. On the gas side, piston rings 178 protect the O-ring seals from direct contact with the hot braking or exhaust gases. In the region of half the length of the cooling pipe 170, the same is connected with the pressure container 9 by a fixing device 179 formed by a screw. It is thus secured against oscillations. Thermal expansions of the cooling pipe 170 are divided to both sides.

Instead of a single cooling pipe 170 it is also possible to insert an entire package of cooling pipes into the pressure container 9. Several cooling pipes are joined with the end flanges and this entire pipe package is inserted into the pressure container 9.

The cooling device 17 can further comprise an outside cooling jacket 18 which is connected with the cooling pipe 170 in the region of the ends 173, 174.

As is indicated by the arrows 16, 16', the coolant reaches the cooling device 17 via the coolant connection 19, flows through the cooling pipe 170 and the outside cooling jacket 18 and leaves the cooling device 17 via the coolant connection 19'. As an alternative to this, a coolant transfer 19a to the outside cooling jacket 18 can be provided for each cylinder, through which the coolant reaches the cooling jacket 18. The inserted cooling pipe 170 is only included in the cooling circulation at the ends 173, 174.

Moreover, the cooling device 17 may comprise a thermostatically controlled coolant control element 26 (FIG. 1) which is preferably arranged in the coolant circulation of the internal combustion engine. It is also possible to provide a separate coolant circulation for the brake rail 9 (e.g. as a bypass to the coolant circulation) and to arrange a coolant control element there.

Figure 13:
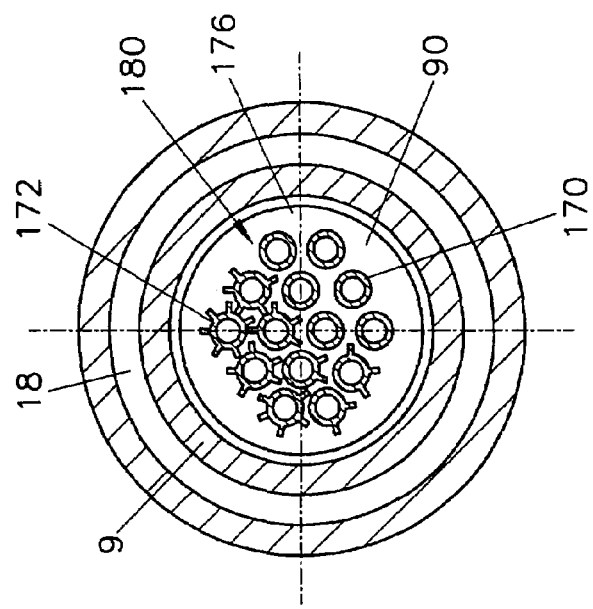
FIG. 13 shows said pressure container in a sectional view along line XIII-XIII in FIG. 12.
Figure 12:
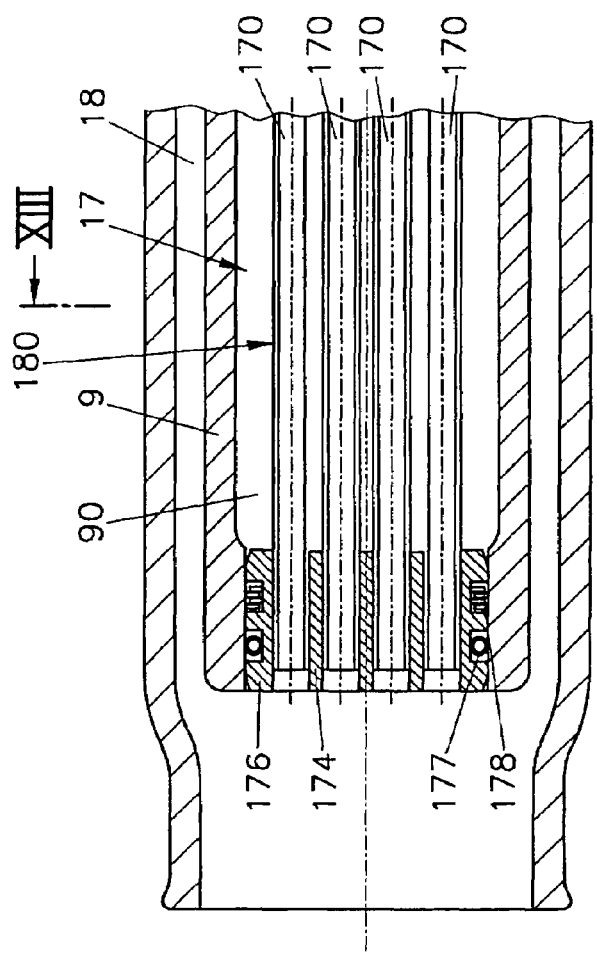
FIG. 12 shows a pressure container in a second embodiment in a side view.

FIGS. 12 and 13 show an embodiment of a pressure container with a bundle 180 of cooling pipes 170. The cooling pipes 170 are fixed parallel with respect to each other in flanges 175, 176 and are arranged in a longitudinally displaceable way in the pressure container 9 with these flanges 175, 176. The outside jackets 171 can be provided with a smooth configuration or comprise cooling fins 172 for enlarging the surface touched by the hot gas.

Since the engine brake system in accordance with the invention works independent of any conventional intake and exhaust systems of the engine, the function of the engine brake is independent of the respective charging system (aspirating engine/conventional turbocharger/VTG). The engine output in fuelled operation is advantageously not reduced.

The invention claimed is:

1. A multicylinder internal combustion engine comprising intake valves and exhaust valves which are provided with at least one additional valve for each cylinder, a pressure container with a gas chamber into which extend ducts originating from the valves so that gas can be exchanged between individual cylinders when the valves are actuated, with the pressure container comprising a device for cooling the quantities of gas exchanged between individual cylinders, wherein the cooling device comprises at least one cooling pipe which is axially inserted into the pressure container and is penetrated by coolant, with the outside jacket of the cooling pipe being adjacent to the gas chamber and being circulated by gas exchanged between the individual cylinders, and wherein at least one cooling fin which is connected in a thermally conductive manner with at least one cooling pipe is arranged in the gas chamber of the pressure container.

2. An internal combustion engine according to claim 1, wherein the cooling device comprises a bundle of coolant-penetrated cooling pipes which is inserted axially into the pressure container, with the outside jackets of the cooling pipes bordering the gas chamber of the pressure container and being circulated by gas exchanged between the individual cylinders.

3. An internal combustion engine according to claim 1, wherein at least one cooling fin which is connected in a thermally conductive manner with at least one cooling pipe is arranged within at least one cooling pipe.

4. An internal combustion engine according to claim 1, wherein the at least one cooling fin is twisted in a screw-like manner in the direction of the longitudinal axis of the pressure container.

5. An internal combustion engine according to claim 1, wherein the cooling device comprises a cooling jacket which comprises the tubular pressure container and is penetrated by coolant.

6. An internal combustion engine according to claim 1, wherein the cooling jacket is flow-connected with the cooling pipe in the region of the ends of the cooling pipe.

7. An internal combustion engine according to claim 1, wherein the cooling pipe is connected with the pressure container with at least one fixing device, with the fixing device preferably being arranged in the region of half the length of the cooling pipe.

8. An internal combustion engine according to claim 1, wherein the cooling pipe or the bundle of cooling pipesis an extruded profile.

9. An internal combustion engine according to claim 1, wherein the cooling pipe or the bundle of cooling pipesis a hydroformed thin-walled sheet metal pipe.

10. An internal combustion engine according to claim 1, wherein the cooling fin is formed in an integral manner with the cooling pipe.

11. An internal combustion engine according to claim 1, wherein the cooling fin is soldered onto the cooling pipe.

12. An internal combustion engine according to claim 1, wherein the cooling pipe or the bundle of cooling pipes is incorporated at the ends into a flange each and is inserted together with the two flanges into the pressure container.

13. An internal combustion engine according to claim 12, wherein the cooling pipe or the bundle of cooling pipes is sealed by an O-ring seal on the coolant side between flange and pressure container.

14. An internal combustion engine according to claim 13, wherein the O-ring seal is protected on the side of the gas chamber by a piston ring arranged between the flange and the pressure container.

* * * * *